UNITED STATES PATENT OFFICE.

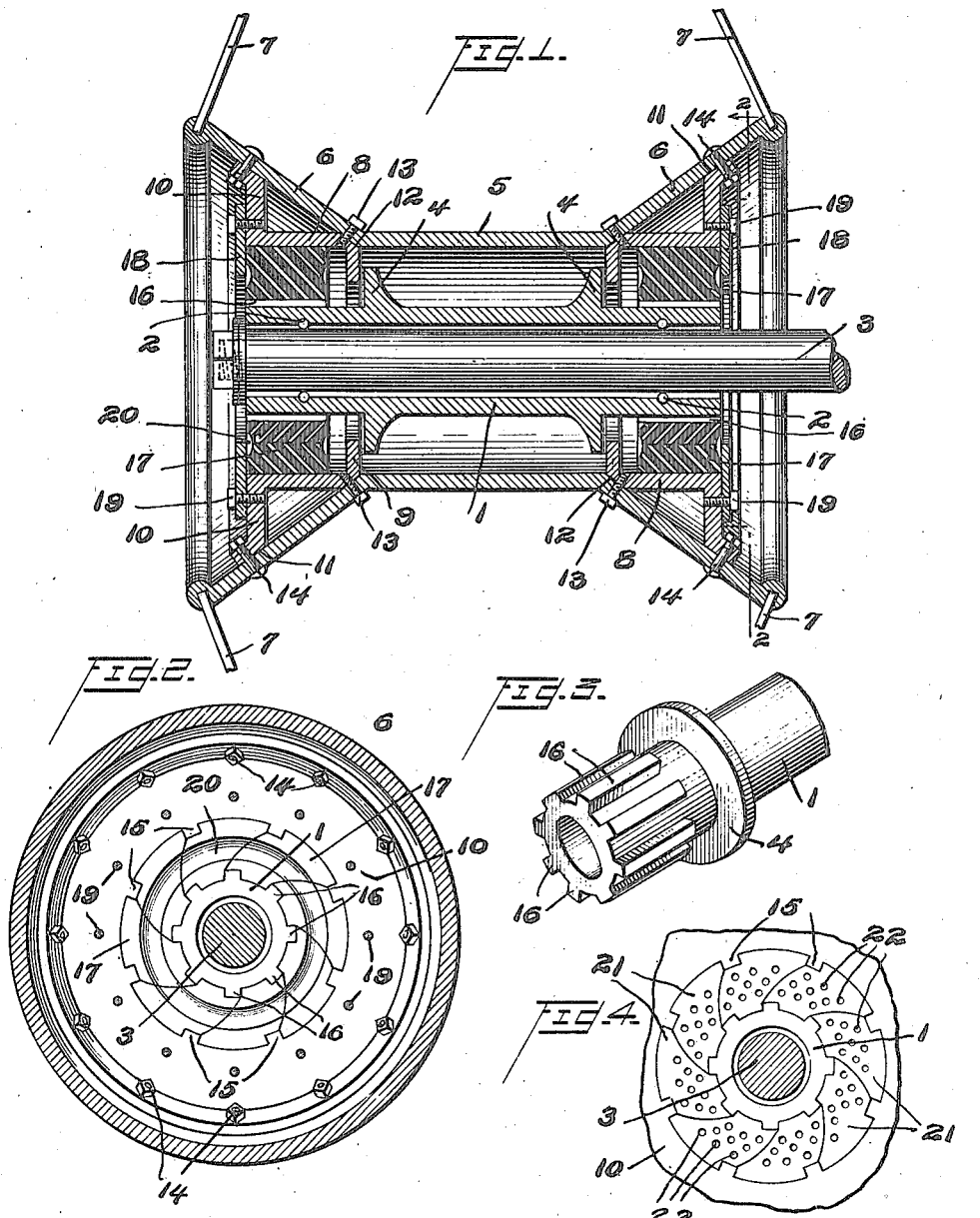

ROBERT HOPKINS, OF SHEFFIELD, ALABAMA, ASSIGNOR OF ONE-HALF TO
A. G. WEIDENSEE, OF SHEFFIELD, ALABAMA.

VEHICLE-WHEEL.

1,185,098.           Specification of Letters Patent.     Patented May 30, 1916.

Application filed March 16, 1915. Serial No. 14,795.

*To all whom it may concern:*

Be it known that I, ROBERT HOPKINS, a citizen of the United States, residing at Sheffield, in the county of Colbert and State of Alabama, have invented certain new and useful Improvements in Vehicle-Wheels, of which the following is a specification.

My invention relates to an improved vehicle wheel, and it consists in the constructions, combinations, and arrangements herein described and claimed.

An object of my invention is to provide an improved vehicle wheel of the cushion hub type especially adapted for wheels constructed with wire spokes, which will eliminate the excessive shocks and jars transmitted to the vehicle axle in previous constructions.

A further object of my invention is to provide a strong and durable vehicle wheel of the cushion hub type provided with a pair of thrust members spaced widely at the opposite sides of the medial plane of the wheel rim and having annular cushioning means spaced axially from the outer faces of said thrust members.

In the accompanying drawing:—Figure 1 is an axial section of a vehicle hub, illustrating one embodiment of my invention; Fig. 2 is a section on the line 2—2 of Fig. 1; Fig. 3 is a detail perspective view of one end of the hub box shown in Figs. 1 and 2, and Fig. 4 is a detail view, showing a modified form of cushioning members.

Referring to the drawing, 1 indicates the hub box mounted on ball bearings 2 on a vehicle axle 3, and provided with a pair of thrust disks 4 widely spaced at the opposite sides of the medial plane of said hub box.

A hub casing is spaced concentrically about the box 1, and comprises a central cylindrical section 5 provided with outwardly-flaring conical end portions 6. A series of wire spokes 7 are shown converging outwardly from the two conical casing portions 6 for attachment in any usual manner to the wheel rim positioned in the medial plane of the hub. A pair of annular members are provided with inclined portions 11 and 12 adapted to fit within the conical casing portions 6, in which they are secured by series of bolts 13 and 14, which are accessible from the exterior of the hub casing for ready detachment and replacement of the annular members; said annular members comprising cylindrical portions 8 provided with outwardly-extending annular flanges 10, and with inwardly-extending annular bearing flanges 9 adapted to engage the respective thrust disks 4. The cylindrical portions 8 of said annular members are provided on their inner peripheries with sets of driving lugs 15 which coöperate with similar sets of driving lugs 16 extending from the respective ends of the hub box 1 with their inner ends spaced from the adjacent thrust disks 4. Independent annular series of cushioning members 17 are confined between said cylindrical portions 8 and the hub box, and are provided with recesses for receiving said driving lugs 15 and 16. This provides an improved construction, in which the respective annular members are provided with bearing flanges 9 integral with cylindrical portions 8, which latter constitute containers for the series of cushioning members 17; said annular members having inclined portions 11 and 12, which are adapted to wedgingly engage the tapered conical ends 6 of the hub casing. Thus, each annular member constitutes a single detachable element comprising a bearing plate 9 formed integral with a cylindrical container 8 for the series of cushioning-members, and provided with inclined portions 11 and 12 which wedgingly engage the tapered conical ends 6 of the hub casing and constitute a common means for centering and positioning said bearing plate and container.

The cushioning members 17 are formed of any suitable material, and are shown provided with reduced or recessed portions to insure an advantageous cushioning action thereof. In Figs. 1 and 2, I have shown annular series of overlapping cushioning members provided on their radial faces with annular recesses 20 of arc-shaped cross section; thereby providing an improved construction in which the cushioning action of the annular series of overlapping members 17 is augmented uniformly in proportion to the increase of the compression force exerted thereon.

Annular plates 18 are suitably secured, as by bolts 19, to the outwardly-extending radial flanges 10 of the respective annular members for confining the adjacent annular series of cushioning members 17.

From the above description, it will be understood that my invention provides an improved vehicle wheel, having a pair of thrust disks spaced widely at both sides of the medial plane of the wheel rim and provided with annular series of cushioning members spaced axially from the outer faces of said thrust disk; thereby providing a highly advantageous and strong construction adapted to operate with a minimum of friction and an elimination of binding strains under all practical conditions.

Fig. 4 illustrates a modified form of cushioning means, which comprises an annular series of overlapping cushion members 21 having several concentric annular series of apertures 22 extending axially therethrough: the apertures of said several series being arranged in staggered relation. This provides a durable and advantageous construction, in which the cushioning members 21 will be subjected to a substantial uniform compression throughout their entire mass.

I have illustrated and described preferred and satisfactory constructions, but changes could be made within the spirit and scope of my invention.

I claim:

1. In a vehicle wheel, a central hub box provided with a pair of spaced thrust disks, a hub casing provided with conical ends, annular members provided with inclined portions for wedgingly engaging within said conical casing ends, each annular member comprising a bearing flange for engaging the corresponding thrust disk and a cylindrical container, and cushioning members positioned in said cylindrical containers in engagement with said hub box.

2. In a vehicle wheel, a central hub box provided with a pair of spaced thrust disks, a hub casing provided with conical ends, annular members provided with inclined portions for wedgingly engaging within said conical casing ends, said annular members comprising cylindrical containers provided with radial bearing flanges for engaging said thrust disks, coöperating driving lugs on the opposed walls of said hub box and cylindrical containers, cushioning members positioned in said cylindrical containers in engagement with said coöperating driving lugs, and means accessible from the exterior of said hub casing for detachably securing said annular members in position.

3. In a vehicle wheel, a central hub box provided with a pair of spaced thrust disks, a hub casing provided with conical ends, annular members comprising cylindrical containers provided at their outer ends with outwardly-extending radial flanges and at their inner ends with inwardly-extending radial flanges for engaging said thrust disks, the outer faces of said flanges being inclined to wedgingly engage within said conical casing ends, coöperating driving lugs on the opposed walls of said hub box and cylindrical containers, cushioning members positioned in said cylindrical containers in engagement with said coöperating driving lugs, and annular plates secured to said outwardly-extending radial flanges for confining said cushioning members within said cylindrical containers.

In testimony whereof I affix my signature in presence of two witnesses.

ROBERT HOPKINS.

Witnesses:
G. H. WOODARD,
R. E. WHITAKER.